US010089978B2

(12) United States Patent
Kurata et al.

(10) Patent No.: US 10,089,978 B2
(45) Date of Patent: *Oct. 2, 2018

(54) DETECTING CUSTOMERS WITH LOW SPEECH RECOGNITION ACCURACY BY INVESTIGATING CONSISTENCY OF CONVERSATION IN CALL-CENTER

(71) Applicant: INTERNATIONAL BUSINESS MACHINES CORPORATION, Armonk, NY (US)

(72) Inventors: Gakuto Kurata, Tokyo (JP); Masayuki A. Suzuki, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/823,074

(22) Filed: Nov. 27, 2017

(65) Prior Publication Data

US 2018/0082676 A1    Mar. 22, 2018

Related U.S. Application Data

(63) Continuation of application No. 15/172,921, filed on Jun. 3, 2016, now Pat. No. 9,870,765.

(51) Int. Cl.
*G10L 15/01* (2013.01)
*G10L 15/06* (2013.01)
(Continued)

(52) U.S. Cl.
CPC ............ *G10L 15/01* (2013.01); *G10L 15/063* (2013.01); *G10L 15/18* (2013.01); *G10L 15/26* (2013.01); *G10L 15/30* (2013.01); *G10L 17/02* (2013.01)

(58) Field of Classification Search
CPC ......... G10L 15/01; G10L 15/06; G10L 15/07; G10L 15/183; G10L 15/26; G10L 15/265; G10L 17/04
(Continued)

(56) References Cited

U.S. PATENT DOCUMENTS

| 8,352,266 B2 | 1/2013 | Farmaner et al. |
| 8,719,024 B1 * | 5/2014 | Moreno .................. G10L 15/04 704/257 |

(Continued)

FOREIGN PATENT DOCUMENTS

| JP | 2012-027065 | 2/2012 |
| WO | 2014/107141 | 7/2014 |

OTHER PUBLICATIONS

Japanese Patent Publication 2012-027065, Machine Translation run on Dec. 15, 2017 from ProQuest Dialog, 7 Pages.*
List of IBM Patents or Patent Applications Treated as Related dated Nov. 27, 2017, 2 pages.
Ogawa, A. et al., "Recognition rate estimation based on word alignment network and discriminative error type classification" Proc. SLT (Dec. 2012) pp. 113-118.
Ogawa, A. et al., "Discriminative recognition rate estimation for n-best list and its application to n-best rescoring" Proc. ICASSP (May 2013) pp. 6832-6836.

*Primary Examiner* — Martin Lerner
(74) *Attorney, Agent, or Firm* — Tutunjian & Bitetto, P.C.; Vazken Alexanian

(57) ABSTRACT

Methods and a system are provided for estimating automatic speech recognition (ASR) accuracy. A method includes obtaining transcriptions of utterances in a conversation over two channels. The method further includes sorting the transcriptions along a time axis using a forced alignment. The method also includes training a language model with the sorted transcriptions. The method additionally includes performing ASR for utterances in a conversation between a first user and a second user. The second user is a target of ASR accuracy estimation. The method further includes determining whether an ASR result of the second user is consistent or inconsistent with an ASR result of the first user using the trained language model. The method also includes estimating the ASR result of the second user as poor responsive to (Continued)

the ASR result of the second user being as inconsistent with the ASR result of the first user.

20 Claims, 8 Drawing Sheets

(51) Int. Cl.
*G10L 15/183* (2013.01)
*G10L 15/26* (2006.01)
*G10L 15/30* (2013.01)
*G10L 15/18* (2013.01)
*G10L 17/02* (2013.01)

(58) Field of Classification Search
USPC ............... 704/235, 236, 243, 244, 250, 255
See application file for complete search history.

(56) References Cited

U.S. PATENT DOCUMENTS

| | | | |
|---|---|---|---|
| 8,977,549 B2* | 3/2015 | Deligne | G10L 15/18 |
| | | | 704/246 |
| 9,870,765 B2* | 1/2018 | Kurata | G10L 15/01 |
| 2002/0120446 A1* | 8/2002 | Chevalier | G10L 15/01 |
| | | | 704/246 |
| 2014/0046663 A1 | 2/2014 | Melamed | |
| 2015/0149162 A1* | 5/2015 | Melamed | G10L 15/20 |
| | | | 704/231 |
| 2017/0352345 A1* | 12/2017 | Kurata | G10L 15/01 |

* cited by examiner

DETECTING CUSTOMERS WITH LOW SPEECH RECOGNITION ACCURACY BY INVESTIGATING CONSISTENCY OF CONVERSATION IN CALL-CENTER

BACKGROUND

Technical Field

The present invention generally relates to speech recognition, and more particularly to detecting customers with low speech recognition accuracy by investigating the consistency of conversation in a call-center.

Description of the Related Art

In Automatic Speech Recognition (ASR) for call-center conversations, ASR accuracy for call-center agents is usually better than that for customers for various reasons. One such reason is that call-center agents have a fixed type of telephone, while different customers use different types of telephone. Another reason is that call-center agents are trained for the service and use typical phrases, while customers speaks freely. Such variations on the customer side reduce the ASR accuracy.

Poor ASR results are not preferable since they have a negative effect to the application such as, for example, text analytics that use ASR results as input. Thus, there is a need for a way to detect customers with a low speech recognition accuracy. In this way, use of poor ASR results can be avoided.

SUMMARY

According to an aspect of the present principles, a method is provided for estimating automatic speech recognition (ASR) accuracy. The method includes obtaining transcriptions of utterances in a conversation over two channels. The method further includes sorting the transcriptions along a time axis using a forced alignment. The method also includes training a language model with the sorted transcriptions. The method additionally includes performing ASR for utterances in a conversation between a first user and a second user. The second user is a target of ASR accuracy estimation. The method further includes determining whether an ASR result of the second user is consistent or inconsistent with an ASR result of the first user using the trained language model. The method also includes estimating the ASR result of the second user as poor responsive to the ASR result of the second user being as inconsistent with the ASR result of the first user.

According to another aspect of the present principles, a non-transitory computer readable storage medium is provided. The non-transitory computer readable storage medium includes a computer readable program for estimating automatic speech recognition (ASR) accuracy. The computer readable program when executed on a computer causes the computer to perform a method. The method includes obtaining transcriptions of utterances in a conversation over two channels. The method further includes sorting the transcriptions along a time axis using a forced alignment. The method also includes training a language model with the sorted transcriptions. The method additionally includes performing ASR for utterances in a conversation between a first user and a second user. The second user is a target of ASR accuracy estimation. The method also includes determining whether an ASR result of the second user is consistent or inconsistent with an ASR result of the first user using the trained language model. The method additionally includes estimating the ASR result of the second user as poor responsive to the ASR result of the second user being as inconsistent with the ASR result of the first user.

According to yet another aspect of the present principles, a system is provided for estimating automatic speech recognition (ASR) accuracy. The system includes a processor. The processor is configured to obtain transcriptions of utterances in a conversation over two channels. The processor is further configured to sort the transcriptions along a time axis using a forced alignment. The processor is also configured to train a language model with the sorted transcriptions. The processor is additionally configured to perform ASR for utterances in a conversation between a first user and a second user, the second user being a target of ASR accuracy estimation. The processor is further configured to determine whether an ASR result of the second user is consistent or inconsistent with an ASR result of the first user using the trained language model. The processor is also configured to estimate the ASR result of the second user as poor responsive to the ASR result of the second user being as inconsistent with the ASR result of the first user.

According to still another aspect of the present principles, a method is provided for estimating automatic speech recognition (ASR) accuracy. The method includes obtaining transcriptions of utterances in a conversation over two channels. The method further includes sorting the transcriptions along a time axis using a forced alignment. The method also includes training a language model with the sorted transcriptions. The method additionally includes performing ASR for utterances in a conversation between a first user and a second user. The second user is a target of ASR accuracy estimation. The method further includes determining whether an ASR result of the second user is consistent or inconsistent with an ASR result of the first user using the trained language model. The method also includes retraining the language model with any of the transcriptions from the second user being removed for the retraining to improve an accuracy of the language model, responsive to the ASR result of the second user being as inconsistent with the ASR result of the first user. The method additionally includes decoding a new utterance using the retrained language model.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

The present principles are directed to detecting customers with low speech recognition by investigating the consistency of conversation in a call-center.

In an embodiment, the present principles perform such detection by leveraging ASR results of corresponding agents.

By detecting customers whose ASR accuracy is particularly poor, we can remove such customers from succeeding analytics or improve accuracy with using additional computation such as expanding search beam width.

Recently, call centers have been recording agents' and customers' utterances in different channels and transcribing each channel independently using ASR.

In an embodiment, the present principles use the agents' ASR results that are relatively better than the customers to detect the customers whose ASR accuracy is low.

Figure 1:
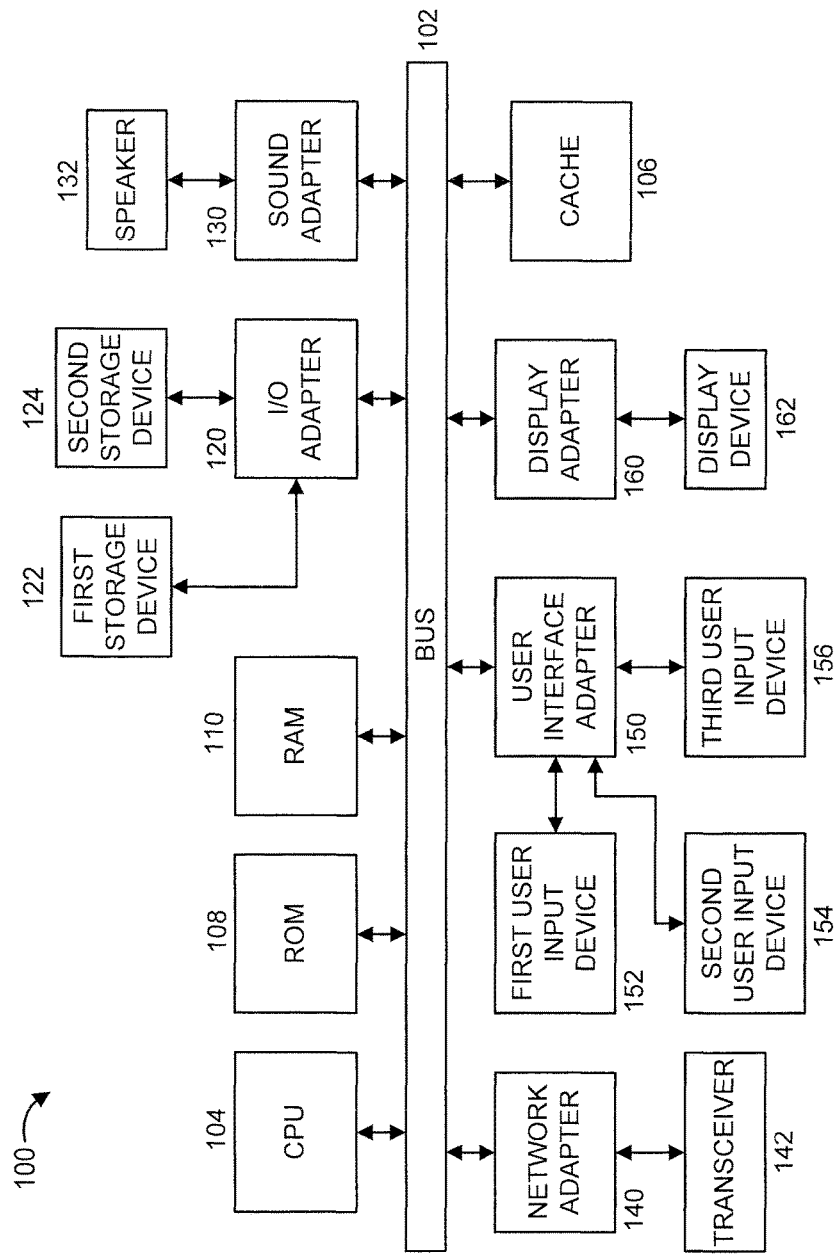
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100. In the embodiment of FIG. 1, at least one of the user input devices 152, 154, and 156 is a microphone for receiving acoustic utterances from one or more speakers.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
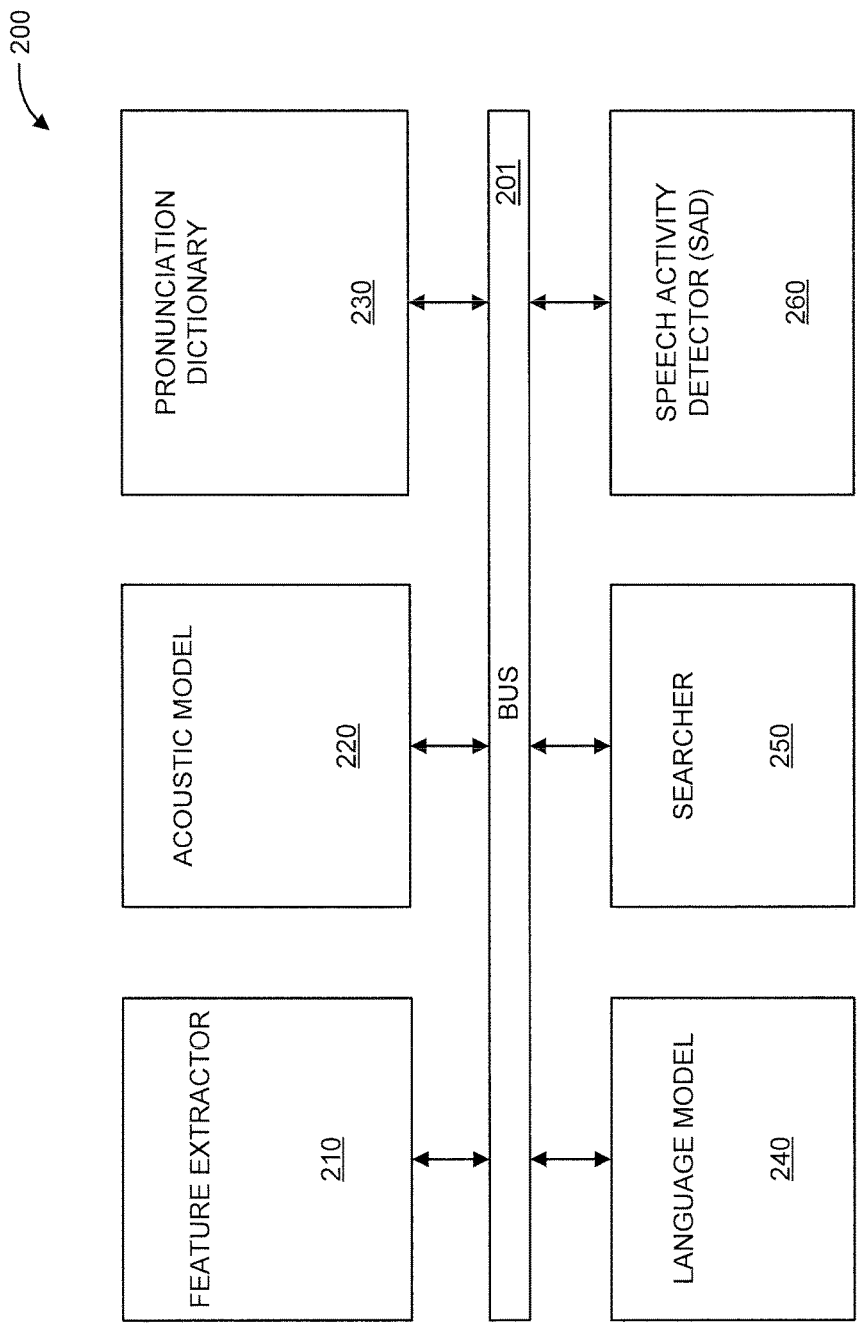
FIG. 2 shows an exemplary automatic speech recognition system (ASR), in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 4:
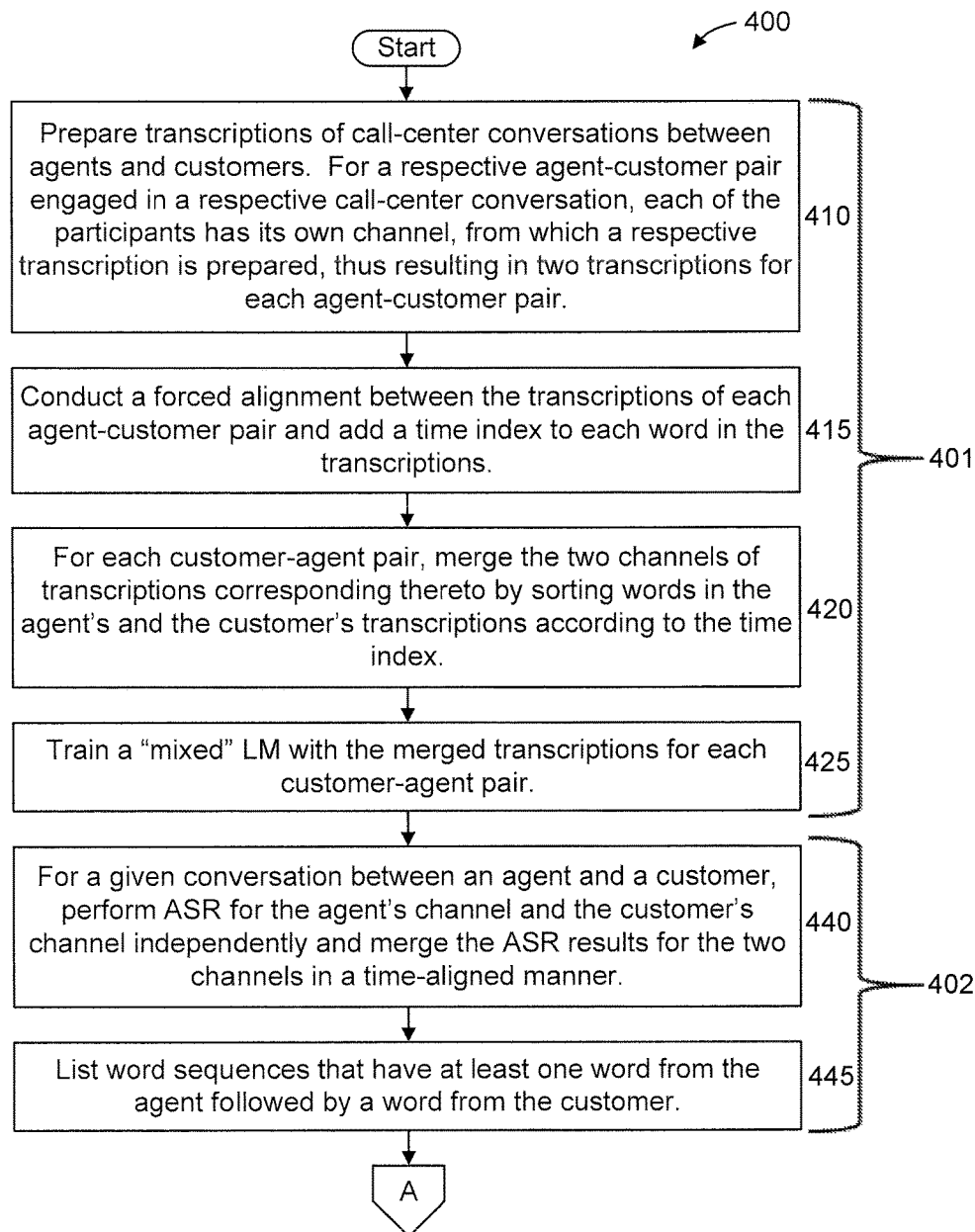
FIGS. 4-5 show an exemplary method for detecting customers with a low speech recognition accuracy, in accordance with an embodiment of the present principles.
Figure 5:
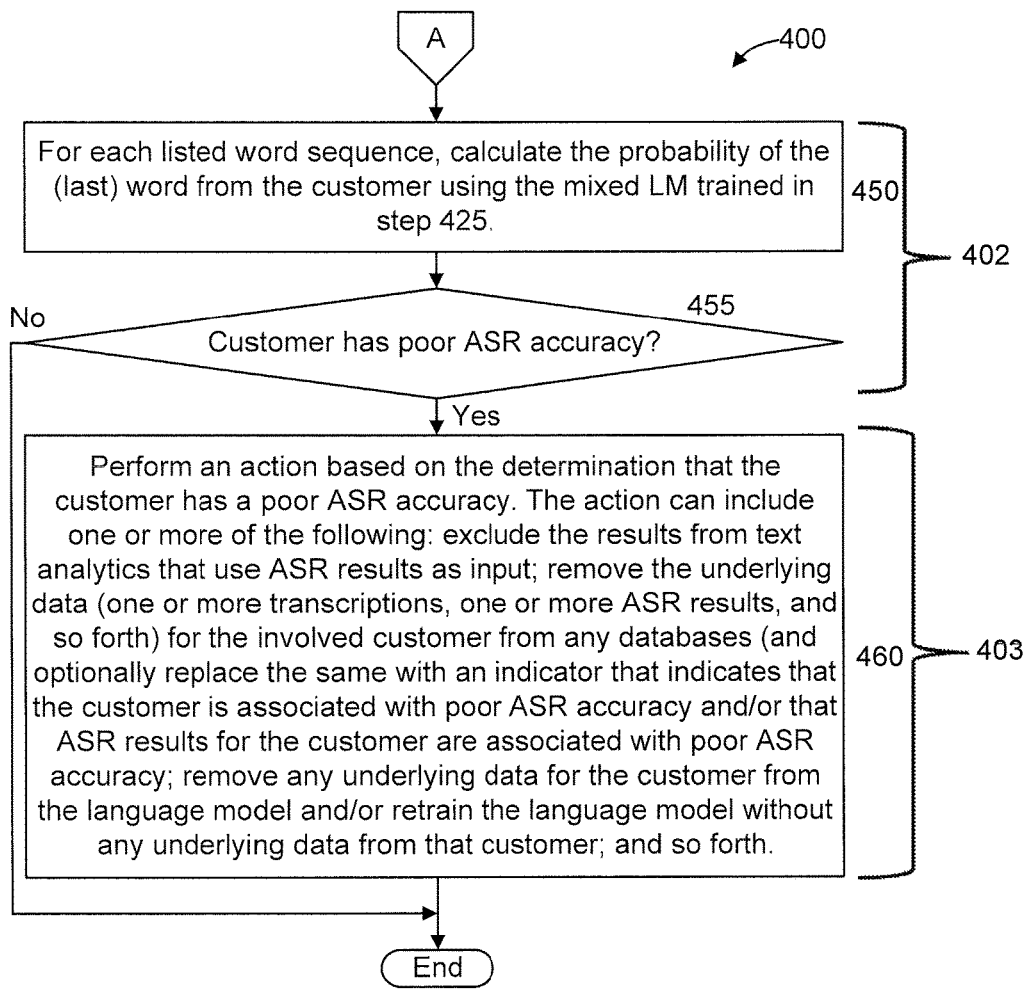

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5.

FIG. 2 shows an exemplary automatic speech recognition system (ASR) 200, in accordance with an embodiment of the present principles.

The system 200 includes a feature extractor 210, an acoustic model 220, a pronunciation dictionary 230, a language model 240, a searcher 250, and a speech activity detector 260.

The searcher 250 performs a search using inputs provided from the feature extractor 210, the acoustic model 220, the pronunciation dictionary 230, and the language model 240 to output one or more words representative of a decoded acoustic utterance. While mentioned in singular form, the feature extractor 210, the acoustic model 220, the pronunciation dictionary 230, and the language model can each include more than one of that element. For example, the acoustic model 220 can include multiple acoustic models, at least two being of a different type.

In a word recognition task, given an acoustic signal corresponding to a sequence of words $X = x_1, x_2, \ldots, x_n$, the feature extractor 210 first generates a compact representation of the input as sequence of feature vectors $Y = y_1, y_2, \ldots, y_t$. Some exemplary features that can be extracted by the feature extractor 210 include, but are not limited to, signal energy, pitch, zero crossing rate, and so forth. It is to be appreciated that the preceding features are merely illustrative and, thus, other features can also be extracted in accordance with the teachings of the present principles, while maintaining the spirit of the present principles.

The acoustic model 220, the pronunciation dictionary 230, and the language model 240 are then used by the searcher 250 to find the most probable word sequence X given these feature vectors. This is done by expressing the desired probability $p(X|Y)$ using Bayes theorem as follows:

$$\hat{X} = \underset{X}{\mathrm{argmax}}\, p(X \mid Y) = \underset{X}{\mathrm{argmax}}\, \frac{p(Y \mid X)p(X)}{p(Y)}$$

where $p(X)$ is the a priori probability of observing a sequence of words in the language, independent of any acoustic evidence and is modeled using the language model component. p(X) corresponds to the likelihood of the acoustic features Y being generated given the word sequence X.

The language model 240 and the acoustic model 220 can be stochastic models trained using large amounts training data. Hidden Markov Models (HMMs) or a hybrid combination of neural networks and HMMs can be used to implement acoustic model 220.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 220 is built for basic speech sounds. By using these basic units, the system 200 can also recognize words without acoustic training examples. It is to be appreciated that the basic speech sounds can be context independent phones or context dependent phones or any other such speech sounds.

To compute the likelihood p(Y|X), each word in the hypothesized word sequence X is first broken down into its constituent phones using the pronunciation dictionary 230. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 240 generates the a priori probability p(x). The language model 240 can be an N-gram based language model(s), where typically bi-grams or tri-grams are used. Although p(x) is the probability of a sequence of words, N-grams model this probability assuming the probability of any word xi depends on only N−1 preceding words. These probability distributions are estimated from simple frequency counts that can be directly obtained from large amounts of text. To account for the inability to estimate counts for all possible N-gram sequences, techniques like discounting and back-off are used. The language model 240 can be, but is not limited to, a Neural Network based language model and/or a class based language model.

The speech activity detector 260 detects speech in an input signal that includes one or more acoustic utterances uttered by a speaker, so that the subsequent steps of speech recognition can focus on the speech portions of the input signal.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles. Moreover, it is to be appreciated that other types and configurations of a speech recognition system can also be used in accordance with the teachings of the present principles, while maintaining the spirit of the present principles. For example, template matching based systems using forms of dynamic time warping can be used, a probabilistic language model could be replaced by a rule based grammar model, and so forth. The ASR system can also be simple recognizer just recognizing phonemes, it could be a simple isolated word recognizer, a digit recognizer based on rules or a large vocabulary continuous speech recognizer, the components of which we have described. These and other types of speech recognition systems and constituent elements are readily determined by one of ordinary skill in the art, given the teachings of the present principles provided herein, while maintaining the spirit of the present principles.

Figure 3:
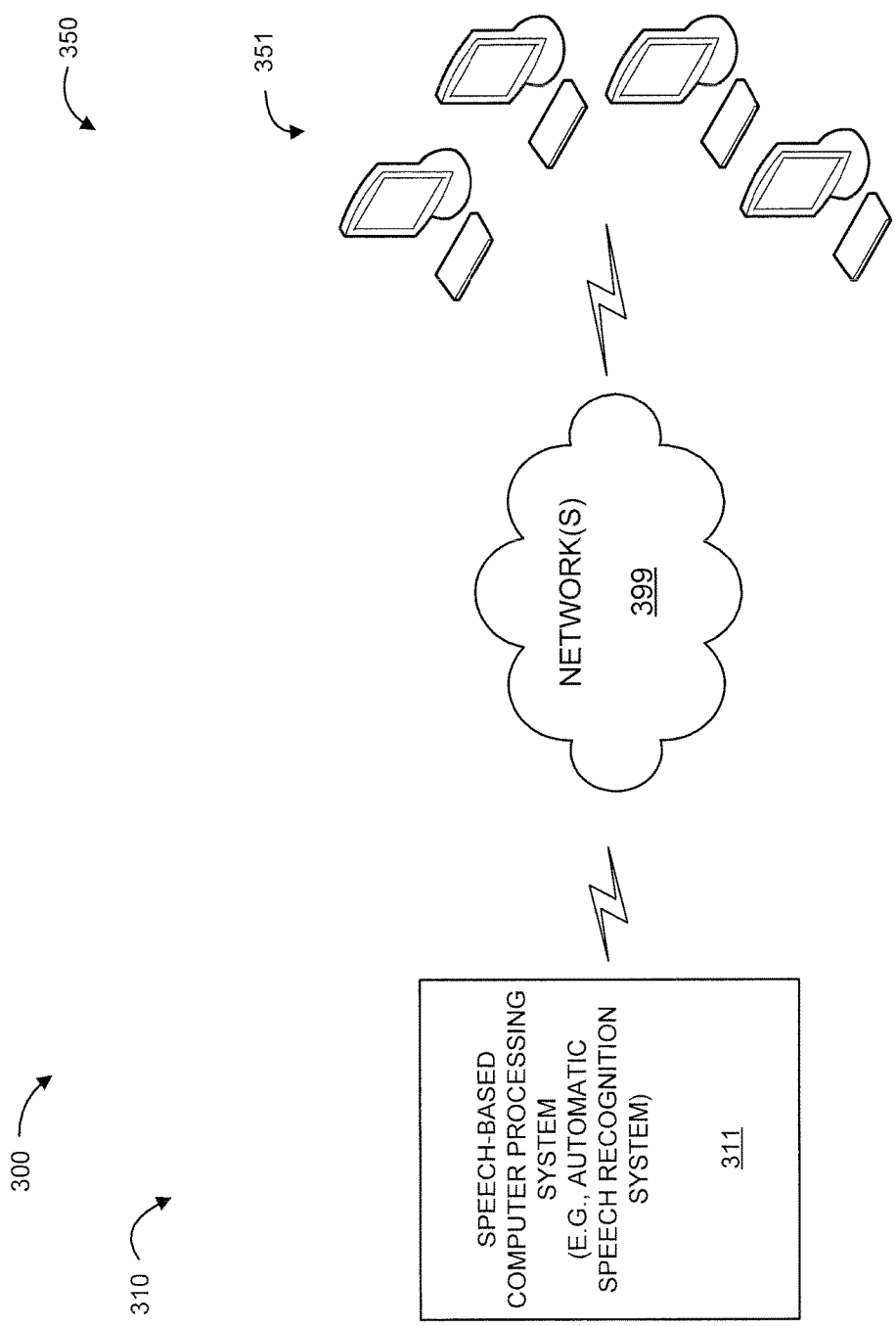
FIG. 3 shows an exemplary operating environment to which the present principles can be applied, in accordance with an embodiment of the present principles.

FIG. 3 shows an exemplary operating environment 300 to which the present principles can be applied, in accordance with an embodiment of the present principles.

The environment 300 involves a server side 310 and a client side 350.

The server side 310 includes a speech-based computer processing system. For illustrative purposes, the speech-based computer processing system is an automatic speech recognition system (ASR) 311. The ASR 311 has improved speech activity detection in accordance with the present principles. In an embodiment, ASR 311 can be implemented as ASR 200 from FIG. 2. However, it is to be appreciated that block 311 can represent any speech-based computer processing system that involves one or more of the following: speech recognition; speaker identification; speaker verification; speaker diarisation; language identification; keyword spotting; emotion detection; automatic translation; court reporting; hands-free computing; home automation; mobile telephony; and so forth.

The client side 350 includes a set of workstations 351.

Users at the workstations 351 can engage in and/or otherwise use speech recognition sessions. The speech recognition sessions can relate, but are not limited to, customer service, voice dialing, machine control, data searching, data entry, system/facility/entity access, and so forth.

Communications between the server side 310 and the client side 350 are made through one or more networks 399.

Thus, in an embodiment, the present principles operate on the presumption that ASR accuracy is higher for agents than for customers. Accordingly, customers are detected whose ASR results are not consistent with the ASR results of the corresponding agent.

Since agents and customers are making conversations, the spoken contents of both speakers are basically "consistent". Hence, if a customer's ASR results are poor, then the customer becomes "inconsistent" with a corresponding agent's ASR results which have a higher accuracy.

For detecting inconsistent ASR results, use a language model (LM) that is trained with the transcription of agents' and customers' utterances. Note that two channels of transcriptions are time-aligned and merged before LM training.

FIGS. 4-5 show an exemplary method 400 for detecting customers with a low speech recognition accuracy, in accordance with an embodiment of the present principles.

It is to be appreciated that while method 400 is primarily described with respect to conversations between agent-customer pairs for the sake of illustration, the present principles can be readily applied to any caller-callee pair involved in a conversation over two separate channels. These and other variations and extensions of the present principles are readily determined by one of ordinary skill in the art given the teachings of the present principles provided herein, while maintaining the spirit of the present principles.

In general, the method 400 can be considered to include two stages, namely a model training stage 401, a call selection stage 402, and an action stage 403. The training stage 401 includes steps 410, 415, 420, and 425. The call selection stage 402 includes steps 440, 445, 450, and 455. The action stage 403 includes step 460.

At step 410, prepare transcriptions of call-center conversations between agents and customers. For a respective agent-customer pair engaged in a respective call-center conversation, each of the participants has its own channel, from which a respective transcription is prepared, thus resulting in two transcriptions for each agent-customer pair. That is, each channel in each agent-customer pair has transcription prepared therefor.

At step 415, conduct a forced alignment between the transcriptions of each agent-customer pair and add a time index to each word in the transcriptions.

At step 420, for each customer-agent pair, merge the two channels of transcriptions corresponding thereto by sorting words in the agent's and the customer's transcriptions according to the time index.

At step 425, train a "mixed" LM with the merged transcriptions for each customer-agent pair.

At step 440, for a given conversation between an agent and a customer, perform ASR for the agent's channel and the customer's channel independently and merge the ASR results for the two channels in a time-aligned manner.

At step 445, list word sequences that have at least one word from the agent followed by a word from the customer. In an embodiment, step 445 lists the word sequences having two words from agent followed by a word from the customer. In this way, tri-grams can be used. Of course, other numbers of words from the agent can also be used in accordance with the teachings of the present principles, while maintaining the spirit of the present principles.

At step 450, for each listed word sequence, calculate the probability of the (last) word from the customer using the mixed LM trained in step 425.

At step 455, determine whether the customer has a poor ASR accuracy based on the average of the calculated probabilities (across each of the listed word sequences). If so, then proceed to step 460. Otherwise, the method is terminated (for this particular agent-customer pair). In an embodiment, step 455 involves comparing the average of the calculated probabilities to a threshold value and, if the average is below the threshold, then the customer is deemed to have a poor ASR accuracy.

At step 460, perform an action based on the determination that the customer has a poor ASR accuracy. The action can include one or more of the following: exclude the results from text analytics that use ASR results as input; remove the underlying data (one or more transcriptions, one or more ASR results, and so forth) for the involved customer from any databases and optionally replace the same with an indicator that indicates that the customer is associated with poor ASR accuracy and/or that ASR results for the customer are associated with poor ASR accuracy; remove any underlying data for the customer from the language model and/or retrain the language model without any underlying data from that customer; decode a new utterance/transcription using the retrained language model; expand the beam width of speech recognition for the agents; re-run speech recognition with a wider beam for the utterances whose ASR accuracy was judged to be poor; and so forth. As is evident to one of ordinary skill in the art, removing data associated with poor ASR accuracy from the language model and retraining the language model without the removed data results in an improved language model that will provide improved ASR results.

Figure 6:
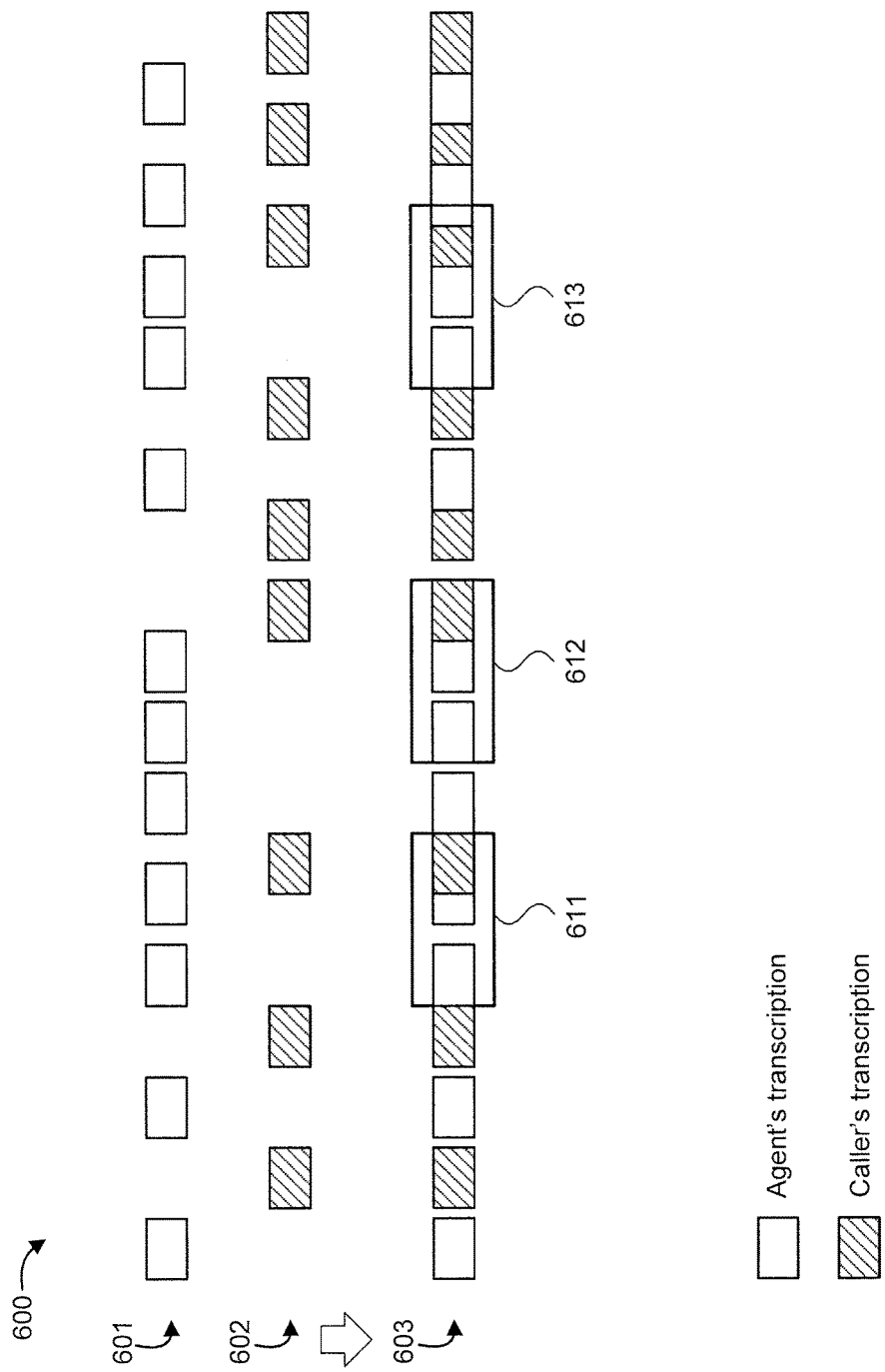
FIG. 6 shows exemplary transcriptions to which the present principles can be applied, in accordance with an embodiment of the present principles.

FIG. 6 shows exemplary transcriptions 600 to which the present principles can be applied, in accordance with an embodiment of the present principles. The transcriptions include an agent's transcription 601, a caller's transcription 602 (shown using a diagonal hatch pattern), and a mixed transcription 603. If tri-grams are used for the mixed LM, then the probabilities of the word sequences in the boxes 611, 612, and 613 are calculated. However, as noted above, other numbers of words can also be used for the mixed LM and thereafter in accordance with the present principles, while maintaining the spirit of the present principles.

In another embodiment, inconsistency of ASR results can be detected by leveraging the probabilities of the agents' ASR results given the customers' ASR results. The LM probabilities by the mixed LM for the agent's recognized results given the history of the customer's recognized results becomes low when the customer's recognition results are poor. This is because the history of the LM is not correct due to the misrecognition for the customer's utterance. Thus, basically the same operation can be used except for swapping the customers' and agents' recognized results.

A description will now be given regarding some of the many attendant advantages provided by the present principles.

ASR sometimes generates recognition errors by relying too much on the LM. In such a case, even though the ASR results are not correct, their perplexity (probabilities with regard to the LM for ASR) becomes small. In recent call-centers, callers' and agents' utterances are recorded in different channels and ASR is conducted independently. By comparing the ASR results of agents and customers in time-synchronous manner in accordance with the present principles, we can detect poor ASR results in a customer's channel by judging if the results are appropriate or not by considering the corresponding agent's utterances.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
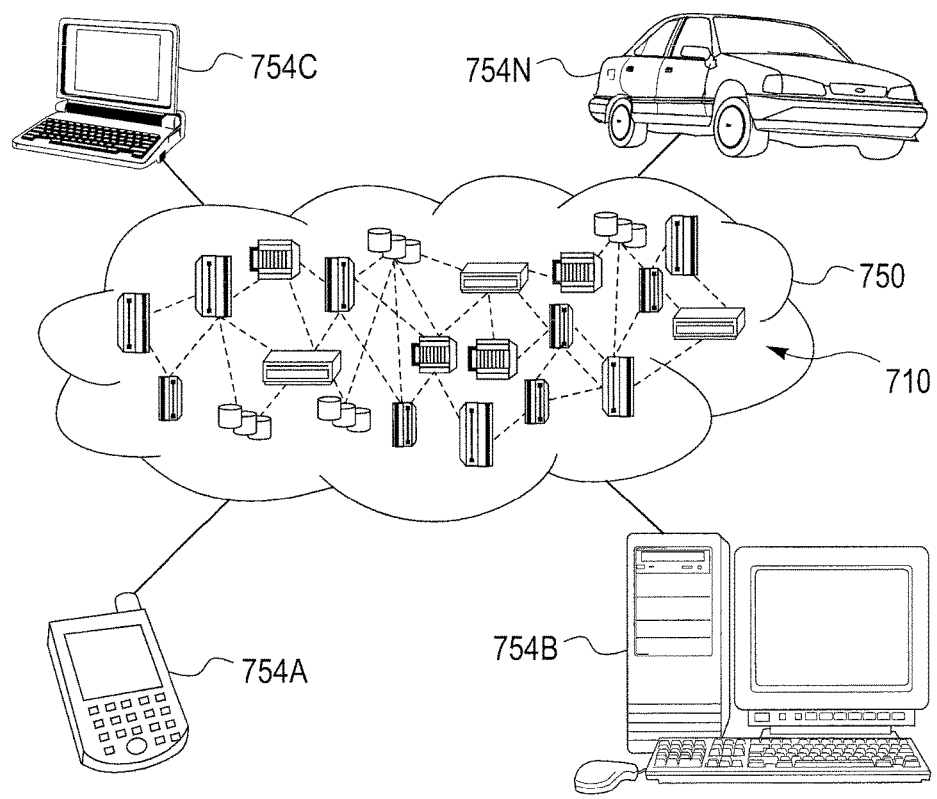
FIG. 7 shows an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
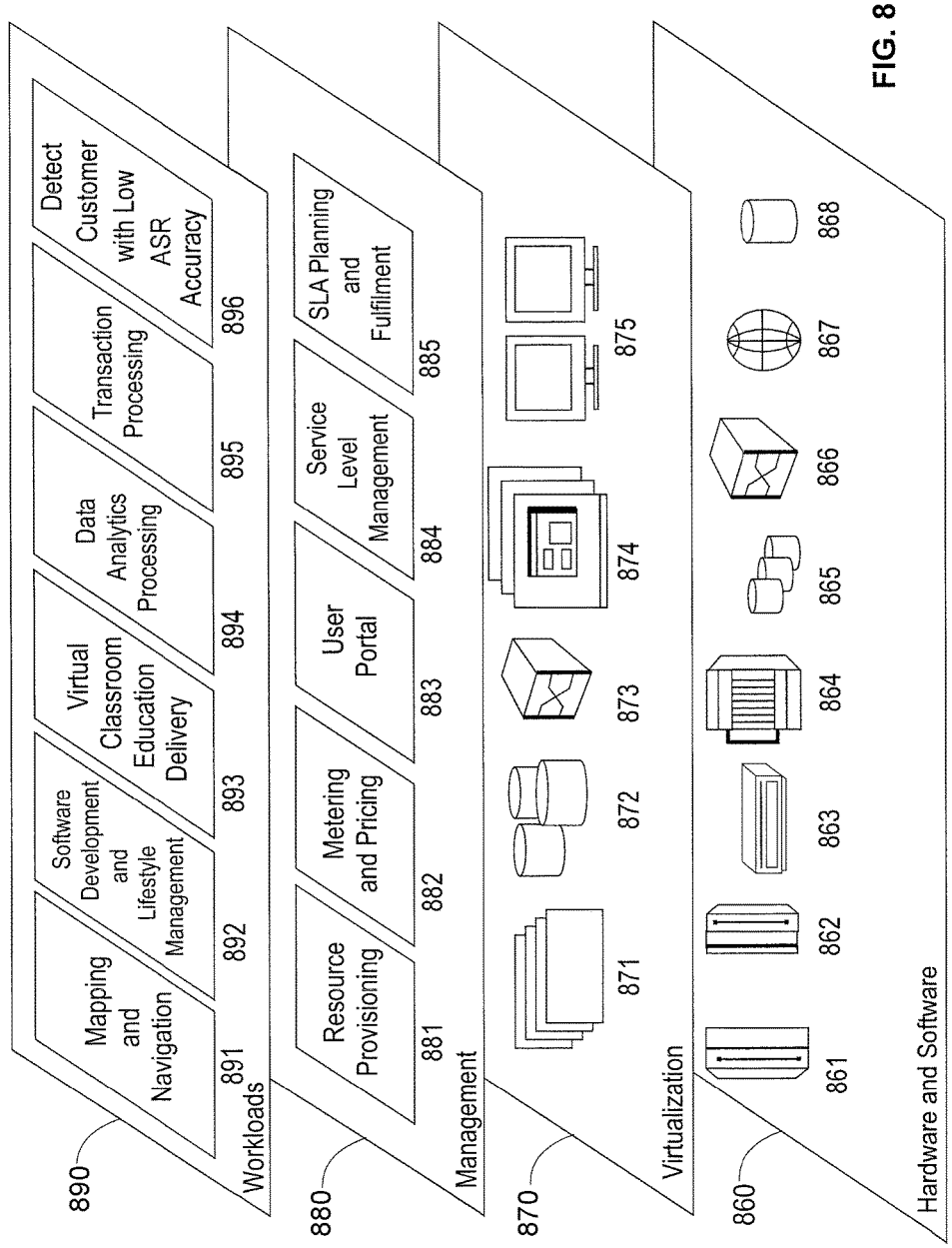
FIG. 8 shows an exemplary set of functional abstraction layers provided by the cloud computing environment shown in FIG. 7, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and detecting customers with low ASR accuracy 896.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for estimating automatic speech recognition (ASR) accuracy, the method comprising:
    obtaining transcriptions of utterances in a conversation over two channels;
    sorting the transcriptions along a time axis using a forced alignment;
    training a language model with the sorted transcriptions;
    performing ASR for utterances in a conversation between a first user and a second user, the second user being a target of ASR accuracy estimation;
    determining whether an ASR result of the second user is consistent or inconsistent with an ASR result of the first user using the trained language model;
    listing word sequences that have at least one word from the first user followed by a word from the second user; and
    estimating the ASR result of the second user as poor responsive to the ASR result of the second user being as inconsistent with the ASR result of the first user.

2. The method of claim 1, wherein said obtaining, sorting, and training steps correspond to a training stage of the method, and said performing, determining, and estimating steps correspond to a call selection stage of the method.

3. The method of claim 1, wherein said obtaining step obtains the transcriptions of the utterances between a plurality of caller-callee pairs.

4. The method of claim 3, wherein a respective one of the transcriptions is obtained for each participant in each of the plurality of caller-callee pairs.

5. The method of claim 1, wherein said sorting step adds a time index to each of the words in each of the transcriptions.

6. The method of claim 5, wherein, for a given pair of participants in the conversation over the two channels, said sorting step merges the transcriptions for the given pair from the two channels by sorting the words in each of the transcriptions corresponding to the given pair according to the time index.

7. The method of claim 6, wherein said training step trains the language model using the merged transcriptions.

8. The method of claim 1, wherein said performing step performs ASR separately for the utterances of the first user and the utterances of the second user to obtain the ASR result of the first user and the ASR result of the second user, and merges the ASR result of the first user with the ASR result of the second user in a time-aligned manner.

9. The method of claim 1, wherein said determining step determines whether the ASR results of the first and second users are consistent or inconsistent by comparing an average of probabilities of the word from the second user across each of the word sequences against a threshold.

10. The method of claim 9, wherein the at least one word from the first user consists of two words, and the probabilities are based on tri-grams formed from the two words from the first user and the word from the second user that follows.

11. The method of claim 9, wherein the average of the probabilities is used as a consistency index.

12. The method of claim 1, wherein determining whether the ASR result of the second user is consistent with the ASR result of the first user includes extracting, from the ASR for each of the utterances in the conversation between the first user and the second user, a word sequence that has a word from the first user followed by a word from the second user and calculating a probability of the word from the second user as a consistency index using the language model.

13. The method of claim 12, further comprising:
    listing a plurality of word sequences from a conversation between the first user and the second user; and
    calculating an average probability of a last word from the second user in each of the plurality of word sequences as a consistency index using the language model.

14. The method of claim 1, wherein the method is performed by an automatic speech recognition system.

15. The method of claim 1, further comprising retraining the language model with any of the transcriptions from the second user being removed for the retraining to improve an accuracy of the language model, responsive to the ASR result of the second user being estimated as poor.

16. A non-transitory computer readable storage medium comprising a computer readable program for estimating automatic speech recognition (ASR) accuracy, wherein the computer readable program when executed on a computer causes the computer to perform the steps of:
    obtaining transcriptions of utterances in a conversation over two channels;

sorting the transcriptions along a time axis using a forced alignment;
training a language model with the sorted transcriptions;
performing ASR for utterances in a conversation between a first user and a second user, the second user being a target of ASR accuracy estimation;
determining whether an ASR result of the second user is consistent or inconsistent with an ASR result of the first user using the trained language model;
listing word sequences that have at least one word from the first user followed by a word from the second user; and
estimating the ASR result of the second user as poor responsive to the ASR result of the second user being as inconsistent with the ASR result of the first user.

17. The non-transitory computer readable storage medium of claim 16, wherein said sorting step adds a time index to each of the words in each of the transcriptions, and wherein, for a given pair of participants in the conversation over the two channels, said sorting step merges the transcriptions for the given pair from the two channels by sorting the words in each of the transcriptions corresponding to the given pair according to the time index.

18. The non-transitory computer readable storage medium of claim 16, wherein said determining step determines whether the ASR results of the first and second users are consistent or inconsistent by comparing an average of probabilities of the word from the second user across each of the word sequences against a threshold.

19. A system for estimating automatic speech recognition (ASR) accuracy, the system comprising:
a processor, configured to:
obtain transcriptions of utterances in a conversation over two channels;
sort the transcriptions along a time axis using a forced alignment;
train a language model with the sorted transcriptions;
perform ASR for utterances in a conversation between a first user and a second user, the second user being a target of ASR accuracy estimation;
determine whether an ASR result of the second user is consistent or inconsistent with an ASR result of the first user using the trained language model;
list word sequences that have at least one word from the first user followed by a word from the second user; and
estimate the ASR result of the second user as poor responsive to the ASR result of the second user being as inconsistent with the ASR result of the first user.

20. The system of claim 19, wherein said processor step determines whether the ASR results of the first and second users are consistent or inconsistent by comparing an average of probabilities of the word from the second user across each of the word sequences against a threshold.

* * * * *